United States Patent
Hsu

(10) Patent No.: US 7,349,313 B2
(45) Date of Patent: Mar. 25, 2008

(54) CLAMPER MAGNETISM TEST METHOD FOR A TRAY-TYPE OPTICAL DRIVE

(75) Inventor: Chen-Jung Hsu, Taipei (TW)

(73) Assignee: Lite-On It Corporation, Taipei (TW)

( * ) Notice: Subject to any disclaimer, the term of this patent is extended or adjusted under 35 U.S.C. 154(b) by 771 days.

(21) Appl. No.: 10/891,326

(22) Filed: Jul. 14, 2004

(65) Prior Publication Data

US 2005/0013209 A1    Jan. 20, 2005

(30) Foreign Application Priority Data

Jul. 16, 2003    (TW) ................. 92119367 A

(51) Int. Cl.
*G11B 7/085*    (2006.01)
(52) U.S. Cl. ............... 369/53.42; 369/53.38; 369/53.39; 369/53.43
(58) Field of Classification Search ............ 369/53.42
See application file for complete search history.

(56) References Cited

U.S. PATENT DOCUMENTS 4,902,971 A * 2/1990 Guzik et al. ............ 342/212
7,086,068 B2 * 8/2006 Inoue ...................... 720/602
2002/0172126 A1* 11/2002 Liao et al. ................ 369/75.2
2005/0259533 A1* 11/2005 Sakagami ................. 369/47.1

FOREIGN PATENT DOCUMENTS

CN    1577560 A   *   2/2005

* cited by examiner

*Primary Examiner*—Dwayne Bost
*Assistant Examiner*—Kezhen Shen
(74) *Attorney, Agent, or Firm*—Thomas, Kayden, Horstemeyer & Risley

(57) ABSTRACT

A magnetism test method for a tray-type optical drive is disclosed. A preliminary input voltage is provided to a DC motor of the tray-type optical drive for performing a preliminary ejection on a tray and a magnetic clamper of the tray-type optical drive. Then, a test voltage smaller than the preliminary input voltage is provided to the DC motor to partially eject the tray, in which the tray is ejected to a point short of the complete distance of ejection. When the incomplete distance is longer than a predetermined distance, the magnetic force of the magnetic clamper is determined to abnormal.

4 Claims, 5 Drawing Sheets

US 7,349,313 B2

CLAMPER MAGNETISM TEST METHOD FOR A TRAY-TYPE OPTICAL DRIVE

BACKGROUND OF THE INVENTION

1. Field of the Invention

The present invention relates to a clamper magnetism test method, and in particular to a method of clamper magnetism testing for a tray-type optical drive.

2. Description of the Related Art

The rapid development of optical media technology has resulted in the use of a variety of different optical drives as computer peripherals. The prevailing design trend is toward optical drives with high retrieval rate.

Optical drives can be categorized as either tray-type or slot-in type according to the way the optical disc is inserted. FIG. 1a shows a conventional tray-type optical drive, which has a tray 10, an optical pickup 20, a turntable 30, and one motor 40. The optical pickup 20, the turntable 30, and the motor 40 are disposed in a frame 50, and the tray 10 is movable and can be inserted into or ejected from the frame 50. Further, a supporting plate 26 is disposed in the frame 50 to hold the optical pickup 20 and the turntable 30.

The motor 40 drives the optical pickup 20, the turntable 30, and a transmission device 52, i.e. a plurality of gears and pulleys, on the frame 50. Generally, there is more than one motor 40 to drive the optical pickup 20, the turntable 30, and the transmission device 52 respectively. The tray 10 has a disc-receiving recess 12 for holding the optical disc and a rack (not shown) disposed under the tray 10 to engage the transmission device 52. Since the supporting plate 26 holds the optical pickup 20 and the turntable 30, the optical pickup 20 moves across the optical disc and the turntable 30 is inserted into the center hole of the optical disc to rotate the optical disc.

Further, a position detecting device, which includes an inner limit switch 54 and an outer limit switch 56 in FIG. 1a, is provided on the frame 50 for detecting and controlling the position of the tray 10 in relation to the frame 50.

Moreover, a clamping device, i.e. a clamper, is generally applied in the optical drive to secure the optical disc on the turntable 30 during rotation. FIG. 1b shows an example of the clamper in a conventional optical drive, in which the clamper 60 is disposed in a rocker shaft to rotate by the pivot 62. When an optical disc 1 is disposed in the optical drive and the turntable 30 is inserted into the center hole of the optical disc 1, the clamper 60 clamps the optical disc 1 on the turntable 30. Thus, the optical disc 1 held between the turntable 30 and the clamper 60 can rotate stably. The clamper 60 can be elastic, magnetic or another type of clamper.

When an optical disc 1 is to be loaded in the optical drive, the tray 10 is ejected. Generally, an ejection key on the panel of the optical drive is pressed 3 to eject the tray 10 from the optical drive. The optical disc 1 is then placed in the disc-receiving recess 12, on the tray 10. The tray 10 is then inserted into the optical drive. The turntable 30 then moves into the center hole of the optical disc 1 and the clamper 60 secures the optical disc 1 on the turntable 30 to rotate the optical disc 1. The optical pickup 20 then moves across the optical disc 1 to perform read and write operations.

Generally, a direct current (DC) motor is employed as the motor 40 to drive and control the sliding of the tray 10 and the clamping operation of the clamper 60. The output torque and the power of the DC motor are variable depending on the input voltage. Thus, ejection or insertion of the tray 10 and the clamping motion of the clamper 60 can be performed simultaneously, and the operation of the optical drive can be effectively enhanced.

The ejection of the tray 10 and the clamping motion of the clamper 60 are described in detail with reference to the flowchart shown in FIG. 1c. When the ejection key on the panel of the optical drive is pressed, an ejection command is sent to the optical drive (step S10), and an input voltage is provided to the DC motor 40 to simultaneously drive the clamper 60 and the transmission device 52 (step S20). Thus, a preliminary ejection stage of the tray 10 is initiated, in which the clamper 60 releases the optical disc 1, and the transmission device 52 provides an ejecting force to the tray 10 over a preliminary time period. When the tray 10 starts moving and activates the inner limit switch 54, the preliminary ejection is completed (step S30), and the optical disc 1 moves off the reading position.

Since the clamper 60 should be disengaged from the optical disc after preliminary ejection, the DC motor 40 stops providing voltage to the clamper 60 and continue driving the transmission device 52 to completely eject only the tray 10 (step S40). The outer limit switch 56 (step S50) is activated during ejection of the tray 10, indicating that ejection is complete, thereafter, the DC motor 40 stops powering the transmission device 52 (step S60).

When the clamper 60 of the tray-type optical drive is a magnetic clamper, however, the magnetic force of the magnetic clamper 60 may be weak or abnormal due to manufacturing flaws or other defects. In this case, reading or writing errors may occur, and the optical disc 1 may be damaged during operation due to inconsistent clamping force.

Preferably a plurality of magnetism tests are performed on each magnetic clamper 60 prior to assembly. However, It wastes a lot of time doing tests on every clamper, and also abnormal magnetic force due to manufacturing flaws and defects, or operation, can hardly be detected prior to assembly.

SUMMARY OF THE INVENTION

Accordingly, an object of the present invention is to provide a clamper magnetism test method for a tray-type optical drive, in which the magnetism of the magnetic clamper in the optical drive is detected by performing a tray ejection test. Thus, the present invention provides a method of detecting magnetic clamper abnormalities, due to manufacturing defects, or operation thereof, prior to assembly.

To achieve the foregoing and other objects, the present invention is directed to a clamper magnetism test method for a tray-type optical drive. A preliminary input voltage is provided to a DC motor of the tray-type optical drive for preliminary ejection of a tray and a magnetic clamper of the tray-type optical drive. Then, a test voltage smaller than the preliminary input voltage is provided to the DC motor to partially eject the tray to a point short of the complete distance of ejection. When the distance of the partial ejection is longer than a predetermined distance, the magnetic force of the magnetic clamper is determined to be abnormal.

In a preferred embodiment of the present invention, the preliminary ejection includes a process of releasing a clamper of the tray-type optical drive and a process of activating an inner limit switch by the tray, and the preliminary input voltage and the test voltage can be determined according to a power/current ratio of the DC motor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

As previously mentioned, a magnetic clamper 60 may perform abnormally due to manufacturing defects, assembly, or operation. Thus, the present invention provides a clamper magnetism test method for a tray-type optical drive, which tests the magnetic force of the clamper in the optical drive by performing a tray ejection test. Thus, magnetic clamper abnormalities, due to manufacturing, assembly, or operation, can be detected with the test method of the present invention.

Figure 1A:
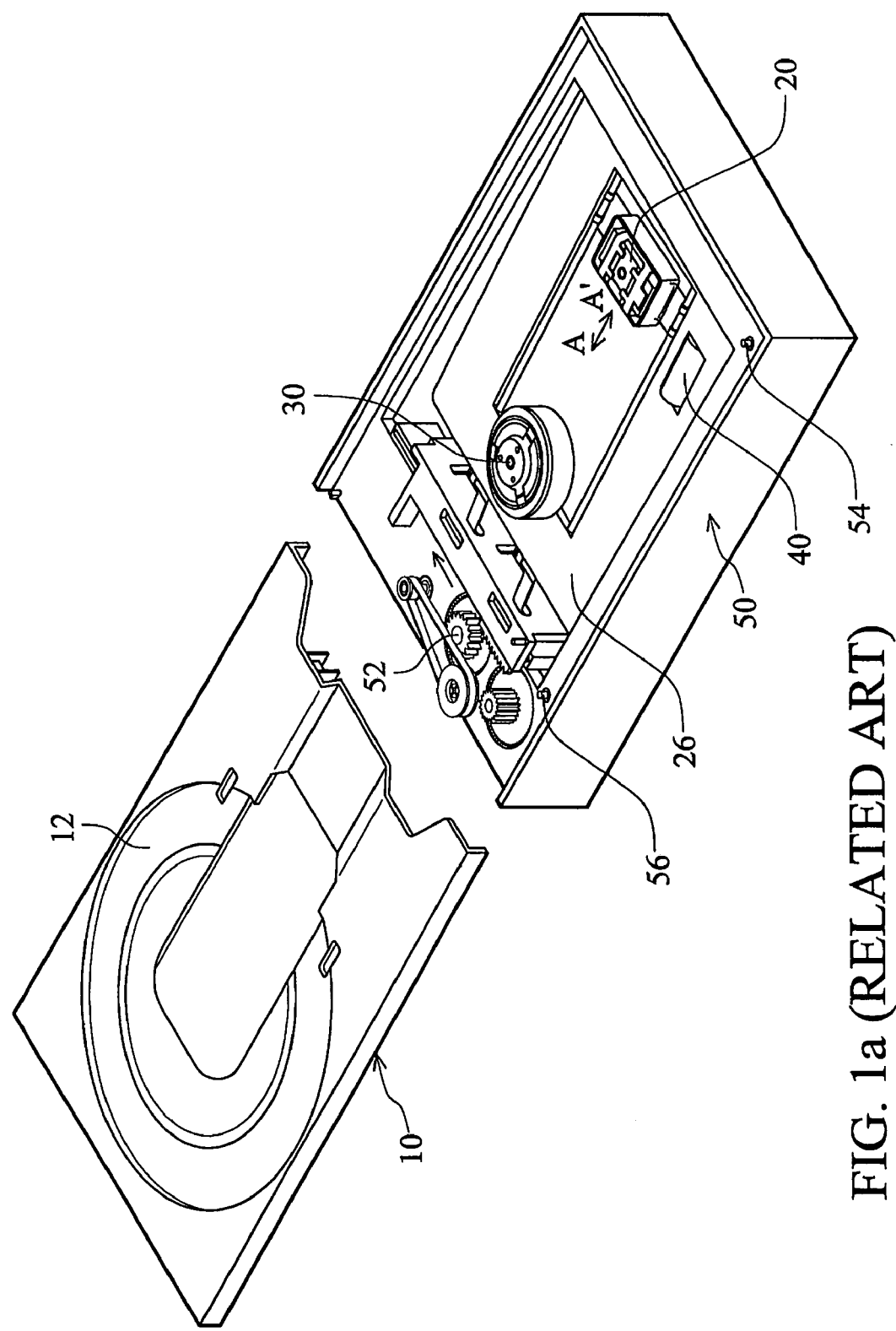
FIG. 1a is a schematic perspective view of a conventional tray-type optical drive.
Figure 1B:
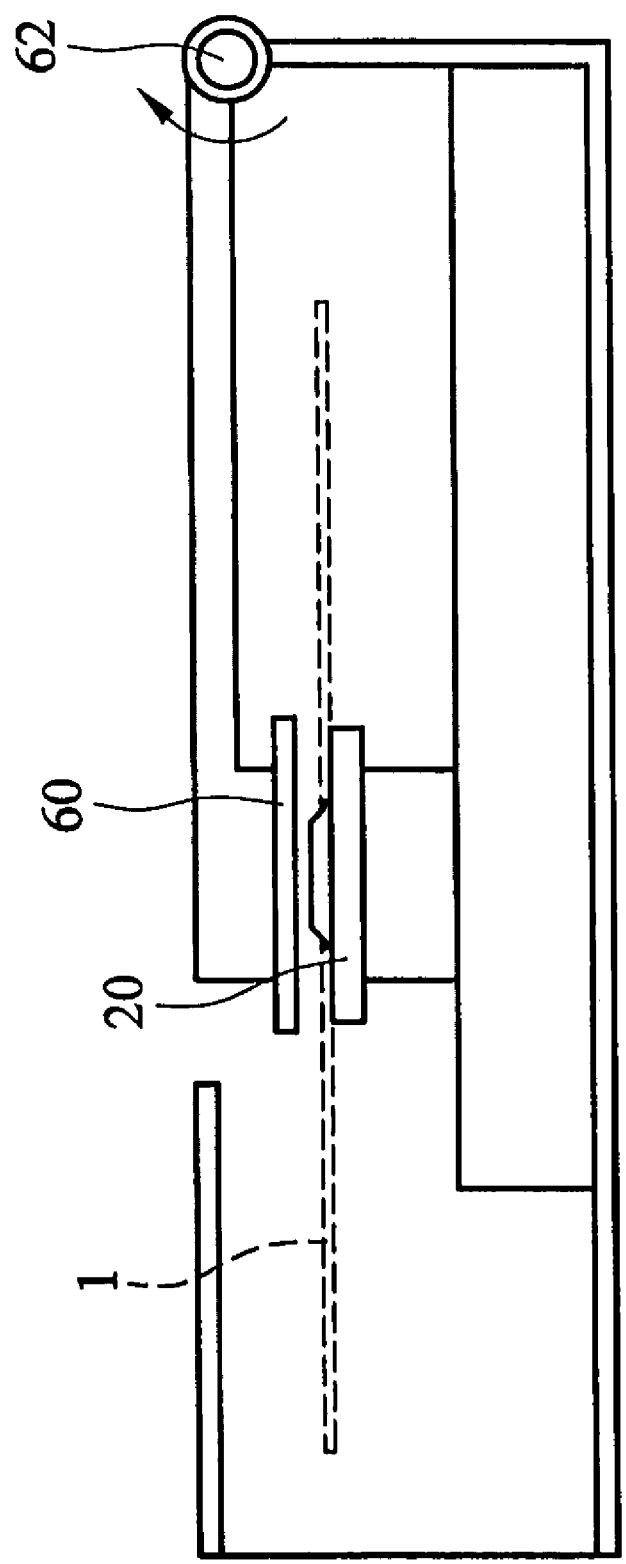
FIG. 1b is a schematic side view of a clamper of the conventional tray-type optical drive.
Figure 2:
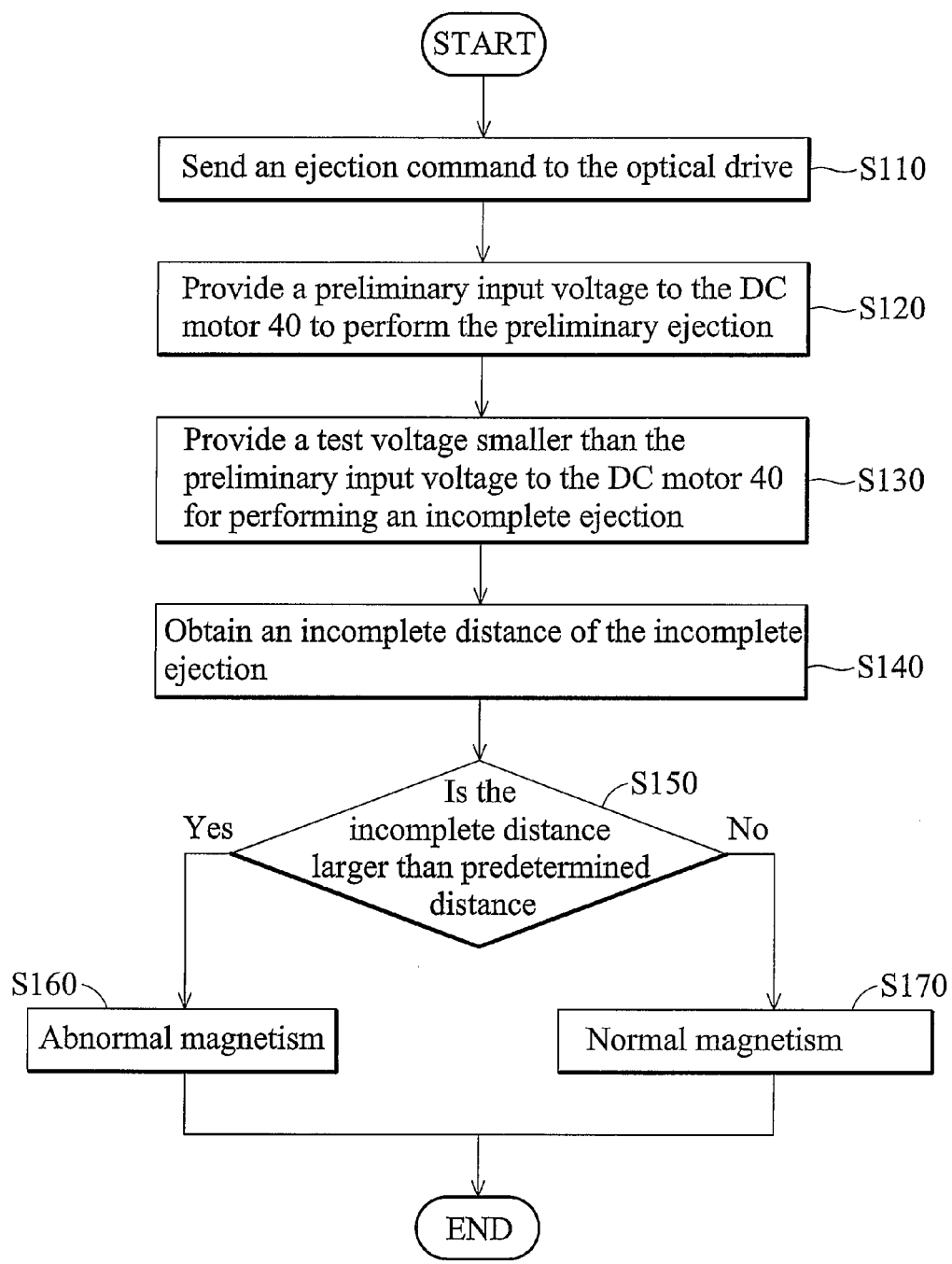
FIG. 2 is a flowchart showing the method of clamper magnetism test of the present invention.

FIG. 2 shows a flowchart of the method of clamper magnetism test of the present invention. The method of the present invention is applicable to a tray-type optical drive, e.g. the conventional tray-type optical drive as shown in FIG. 1a and FIG. 1b, in which the clamper 60 is a magnetic clamper.

When a tray-type optical drive is set to perform the clamper magnetism test, a test command is sent to the optical drive (step S110), and a preliminary input voltage is provided to the DC motor 40 to perform the preliminary ejection (step S120). That is, the DC motor 40 simultaneously drives the magnetic clamper 60 and the transmission device 52.

Figure 1C:
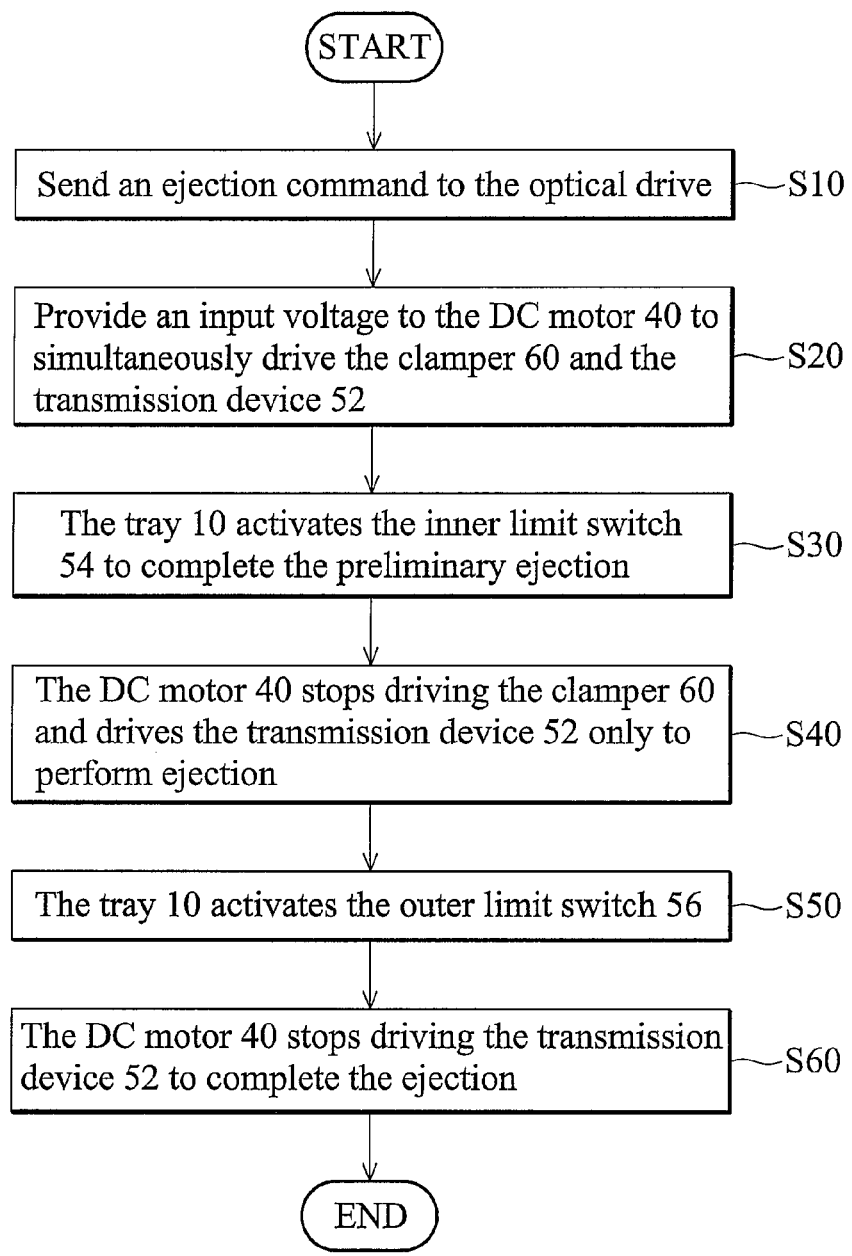
FIG. 1c is a flowchart showing tray ejection of the conventional tray-type optical drive.

As previously described, in steps S20 and S30 in shown in FIG. 1c, a preliminary ejection of the tray 10 is performed, in which the magnetic clamper 60 releases the optical disc 1, and the transmission device 52 drives the tray 10 to tray-out. When the tray 10 reaches a predetermined point in ejection, the inner limit switch 56 is activated indicating the preliminary ejection is complete. The optical disc 1, then moves off the reading position.

If the magnetic clamper 60 provides abnormal magnetic force, however, the power required for the releasing process of the magnetic clamper 60 is reduced. In this case, the remainder of the power supplied during the preliminary ejection is applied to the transmission device 52, and the ejecting force provided to the tray 10 increases substantially. Thereafter the ejection of the try 10 will be affected due to the increased ejecting force.

Upon completion of the preliminary ejection, a test voltage less than the preliminary input voltage is provided to the DC motor 40 to partially eject the tray 10 (step S130). The tray 10 is ejected to a point short of the complete distance of ejection. Thus, an incomplete distance is obtained (step S140). The incomplete distance is relative to the ejecting force provided to the tray 10 during the preliminary ejection. Since the provided ejecting force is substantially increased when the magnetic clamper 60 performs abnormally, the partial ejection distance also increases.

As a result, a predetermined distance is provided as an index of the magnet force of the magnetic clamper 60. The predetermined distance can be obtained from experiments as an average incomplete distance of the optical drive with a normal magnetic clamper. A comparison of the incomplete distance and the predetermined distance is then performed (step S150) to determine the magnetic force of the magnetic clamper 60. When the incomplete distance is longer than the predetermined distance, the magnetism of the magnetic clamper 60 is determined abnormal (step S160). When the incomplete distance is shorter than the predetermined distance, the magnetism of the magnetic clamper 60 is determined normal (step S170).

Figure 3:
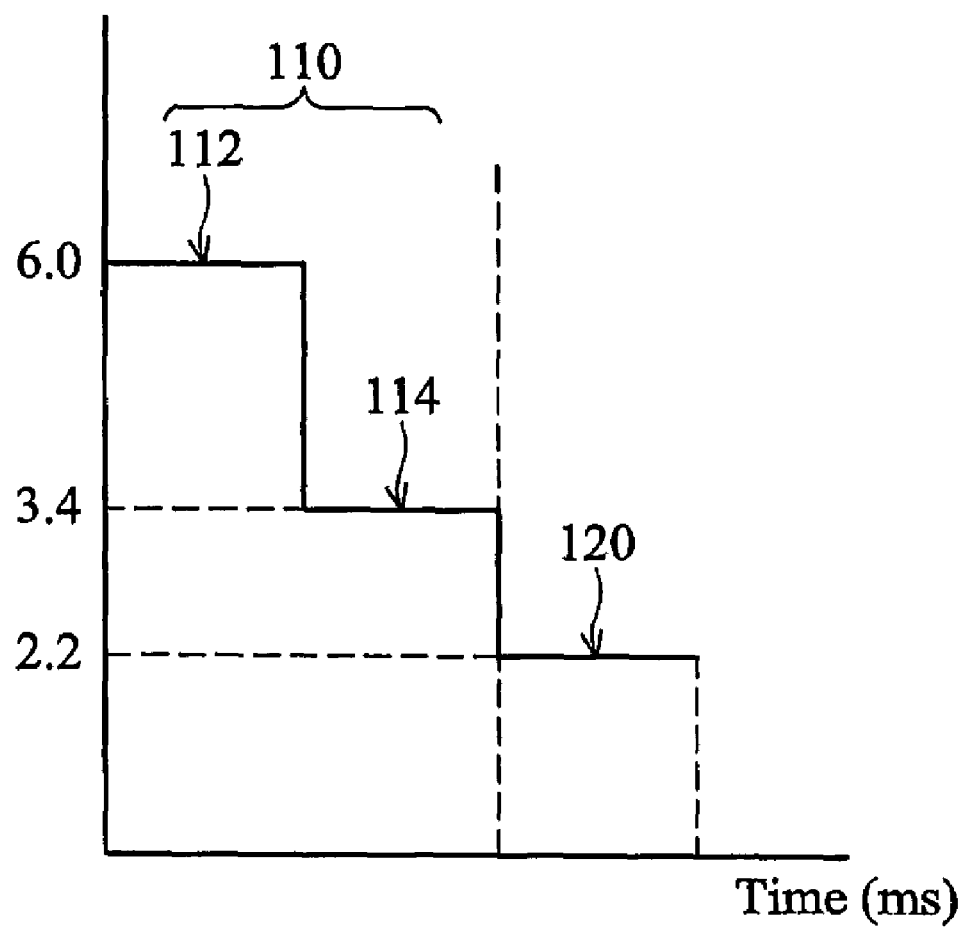
FIG. 3 is a diagram of an embodiment showing the input voltage of the DC motor of the tray-type optical drive to perform the test method of the present invention.

An embodiment of the clamper magnetism test method can be described with reference to FIG. 3, which shows a diagram of the input voltage applied to the DC motor 40. In FIG. 3, the preliminary input voltage includes a first input voltage 112 of 6 volts and a second input voltage 114 of 3.4 volts, enabling the DC motor 40 to simultaneously drive the magnetic clamper 60 releasing the optical disk 1 and the transmission device 52 driving the tray out. Further, a DC voltage of 2.2 volts less than the second input voltage is provided to the DC motor 40 as the test voltage to perform incomplete ejection, as described in step S130.

It should be mentioned that, the preliminary input voltage and the test voltage can be determined in accordance with the characteristics of the DC motor 40. For example, in the aforementioned embodiment, the preliminary input voltage and the test voltage are determined by experiments according to the power/current ratio of the DC motor 40. Accordingly, when a DC motor 40 with significantly different characteristics is applied to the tray-type optical drive, a plurality of incomplete ejection experiments should be performed to adjust the preliminary input voltage and the test voltage. Thus, the method of the present invention can be applied to reliably prevent magnetic abnormalities in the magnetic clampers 60.

Thus, the present invention provides a method of detecting magnetic clamper abnormalities without requiring further magnetic tests. The clamper magnetism tests can be done during the assembly process to save a lot of time and money.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clamper magnetism test method for a tray-type optical drive, comprising the steps of:

providing a DC motor of the tray-type optical drive with a preliminary input voltage to drive a tray and a magnetic clamper of the tray-type optical drive for performing a preliminary ejection;

providing the DC motor with a test voltage for performing an incomplete ejection on the tray, wherein the tray ejects an incomplete distance shorter than a complete ejection distance; and determining the magnetic force of the magnetic clamper as abnormal when the incomplete distance is longer than a predetermined distance.

2. The clamper magnetism test method as claimed in claim 1, wherein preliminary ejection comprises a process of releasing a clamper of the tray-type optical drive and a process of activating an inner limit switch by the tray.

3. The method of clamper magnetism test as claimed in claim 1, wherein the preliminary input voltage and the test voltage are determined according to a power/current ratio of the DC motor.

4. The clamper magnetism test method as claimed in claim 1, wherein the test voltage is smaller than the preliminary input voltage.

* * * * *